UNITED STATES PATENT OFFICE 1,928,545

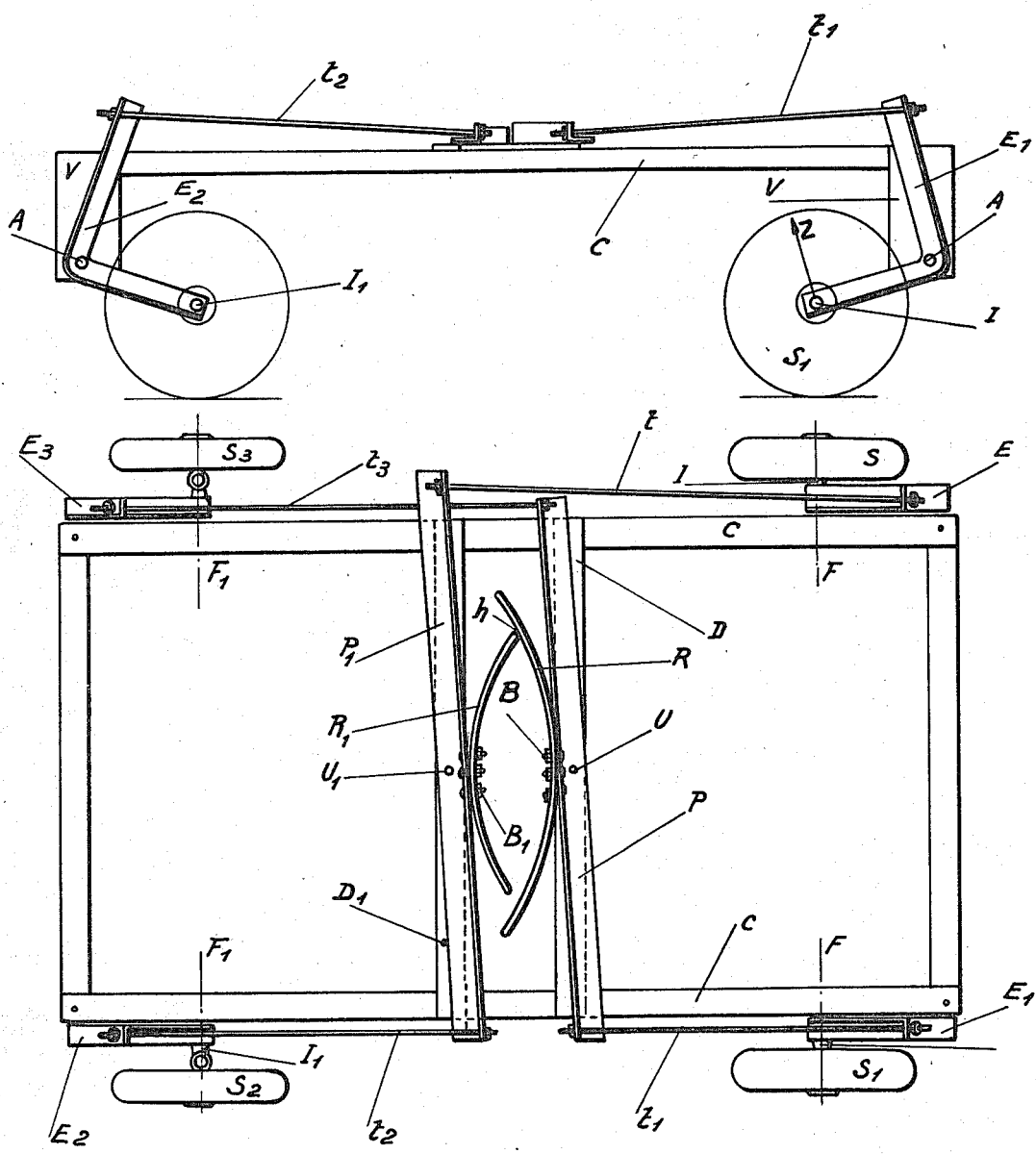

COMPENSATED SUSPENSION DEVICE FOR VEHICLES

Georges Rondier, Paris, France

Application August 13, 1932, Serial No. 628,734, and in France August 24, 1931

2 Claims. (Cl. 280—104)

The invention has for its object a compensated suspension device for vehicles and chiefly for motor-vehicles.

In this device, the ends of axles are pivoted to levers oscillating about horizontal axes, and the diagonally opposed levers are connected by rods or similar members with the ends of a swing-bar pivoted on the frame of the vehicle. Between the two swing-bars, suitable springs are placed, so as to transmit the motion of a swing-bar to the other.

Thus any disturbance exerted in a point of the vehicle is distributed on the whole of the frame and its effect on passengers is considerably reduced.

In the annexed drawing,

Fig. 1 is a plan-view showing schematically a device in conformity with the invention.

Fig. 2 is a corresponding elevation-view.

In this drawing $S$, $S_1$, $S_2$, $S_3$ are the four wheels of the vehicle, C is the frame, F and $F_1$ are the front axle and rear-axle lines. At their ends the axles are pivoted at I and $I_1$, on cranked levers E, $E_1$, $E_2$, $E_3$. These levers are able to oscillate about horizontal shafts A on plates V secured on the frame C.

The diagonally opposed levers are connected with the ends of a swing-bar.

Thus, the left rear lever $E_1$ and the right front lever $E_3$ are connected by rods $t_1$ and $t_3$ respectively with the ends of a swing-bar P pivoted at U on a cross-beam D secured on the frame C. In the same manner the right rear lever E and the left front lever $E_2$ are connected by rods $t$ and $t_2$ respectively with a swing-bar $P_1$ pivoted on a cross-beam $D_1$ of the frame C.

These rods pass through holes of levers and swing-bars, so as to transmit pulling efforts only.

On swing-bars P and $P_1$, springs R and $R_1$ are secured at B and $B_1$, so as to come to contact in the shifting motion of swing-bars P and $P_1$.

This device compensates the disturbances, as it will be shown by the following examples:

*First example.*—It is assumed that the left rear-wheel $S_1$ undergoes an upward shock in the direction of Z while rolling on a stone for instance.

The upper arm of lever $E_1$ is shifted in the right direction, pulling the rod $t_1$ which turns the swing-bar P counter-clockwise. In this motion the spring R pushes at $h$ the spring $R_1$ and consequently the swing-bar $P_1$ rotates in the same direction as P.

The rods $t$ and $t_2$ are then pulled towards the left and towards the right respectively.

The traction exerted on rod $t$ is transmitted to the lever E and it produces an upward movement of the front part of the frame.

It is thus understood that a shock exerted on the left rear wheel is distributed on the whole frame. The same effect would be obtained in case of a shock exerted on any other wheel and consequently the disturbance is as small as possible for the passengers.

*Second example.*—It is assumed that the vehicle turns to the left at a high speed.

In this case under the centrifugal force the vehicle tends to sink on the right side. Consequently the axes of levers E and $E_3$ are lowered and the rods $t$ and $t_3$ are pulled towards the left and towards the right respectively.

The swing-bar $P_1$ is shifted counter-clockwise while the swing-bar P is shifted clockwise, the springs R, $R_1$ being tightened between both swing-bars.

Owing to these angular movements of the swing-bars, the rods $t$ and $t_1$ are released and consequently the left side of the frame is lowered.

Thus whenever the left or right side of the vehicle tends to sink the opposed side is lowered and perfect travelling stability is obtained.

*Third example.*— It is assumed that the vehicle is overloaded at the rear side.

The axes of levers E and $E_1$ are lowered and therefore the rods $t$ and $t_1$ are pulled toward the right. The right arms of swing-bars P $P_1$ are brought nearer and the rods $t$ and $t_3$ are released. Consequently the front part of the frame is lowered. Thus any excessive inclination of the frame to the rear is prevented.

A similar compensation would be obtained if the front part of the vehicle was overloaded.

The hereinbefore disclosed examples of operation prove that the suspension device in conformity with the invention ensures a very good stability and reduces as much as possible the reactions transmitted to the frame by any disturbing effort.

It is well understood that the invention is not limited to the form of execution described and represented, and that any changes might be adopted for the shape and location of levers, swing-bars and connecting members.

I claim:

1. A compensated suspension device for vehicles, comprising in combination a chassis, four levers pivotally mounted on the chassis, a wheel carried by each lever, two swing-bars pivoted about vertical axes mounted on the chassis and horizontally spaced by springs, and rods connecting the ends of each swing-bar to the ends of a pair of levers carrying diagonally situated wheels.

2. A compensated suspension device for vehicles, comprising in combination with a chassis, four bell-crank levers pivotally mounted adjacent the ends of the chassis, said bell-crank levers being positioned so that normally one arm is substantially horizontal and the other arm is substantially vertical, a wheel carried by the horizontal arm of each bell-crank, a pair of swing-bars pivoted on spaced vertical axes carried on the central portion of the chassis, a rod connecting one end of one swing-bar with the vertical arm of the bell-crank carrying the right front wheel, a rod connecting the other end of said swing-bar with the bell-crank carrying the left rear wheel, rods connecting the bell-cranks carrying the left front and the right rear wheels to the corresponding ends of the other swing-bar, and springs between said swing-bars, said bell-crank levers and swing-bars being so positioned and connected that upward movement of any of the wheels will cause the swing-bars to swing about their pivots against the action of the springs.

GEORGES RONDIER.